(12) United States Patent
Yoshida

(10) Patent No.: US 6,271,979 B1
(45) Date of Patent: *Aug. 7, 2001

(54) DIGITAL DATA RECORDING AND REPRODUCING APPARATUS HAVING RECORD OVERFLOW DETERMINING MEANS

(75) Inventor: Masaki Yoshida, Kanagawa (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/817,987

(22) PCT Filed: Aug. 22, 1996

(86) PCT No.: PCT/JP96/02345

§ 371 Date: Apr. 25, 1997

§ 102(e) Date: Apr. 25, 1997

(87) PCT Pub. No.: WO97/08696

PCT Pub. Date: Mar. 6, 1997

(30) Foreign Application Priority Data

Aug. 25, 1995 (JP) .................................................. 7-240983
Aug. 25, 1995 (JP) .................................................. 7-240984

(51) Int. Cl.[7] ............................... G11B 5/09; G11B 15/18
(52) U.S. Cl. .............................. 360/48; 360/39; 360/69
(58) Field of Search .................................. 360/69, 71, 48, 360/39, 55; 369/60

(56) References Cited

U.S. PATENT DOCUMENTS

| | | | | |
|---|---|---|---|---|
| 3,938,105 | * | 2/1976 | Lechner | 360/48 |
| 5,003,506 | * | 3/1991 | Itaya | 711/172 |
| 5,412,513 | * | 5/1995 | Yokota et al. | 360/32 |
| 5,461,630 | * | 10/1995 | Endo et al. | 360/32 |
| 5,592,342 | * | 1/1997 | Hall et al. | 360/48 |
| 5,774,843 | * | 6/1998 | Sugiyama et al. | 704/229 |
| 5,946,154 | * | 8/1999 | Ino | 360/65 |

* cited by examiner

Primary Examiner—Regina Y. Neal
(74) Attorney, Agent, or Firm—Frommer, Lawrence & Haug, LLP.; William S. Frommer; Joe H. Shallenburger

(57) ABSTRACT

As described above, according to the present invention, original data that is input as records is compressed. The compressed data is temporarily stored in the buffer memory and then recorded on the magnetic tape. When data is recorded, it is determined whether or not the buffer memory overflows. When the determined result represents that the buffer memory overflows, the value of the counter is dynamically changed. Thus, the buffer memory can be prevented from overflowing. The compressed data is recorded as entities and recorded to each group. The BAT flag that represents the type of the entity is added.

When data is reproduced, it is determined whether the last entity of the current group is an entity that continues to the next group or an entity that is completed in the current group. When the last entity continues to the next group, the next group is accessed. When the last entity is completed in the current group, no further accessing operation is performed. Thus, the reproducing process can be effectively performed.

8 Claims, 16 Drawing Sheets

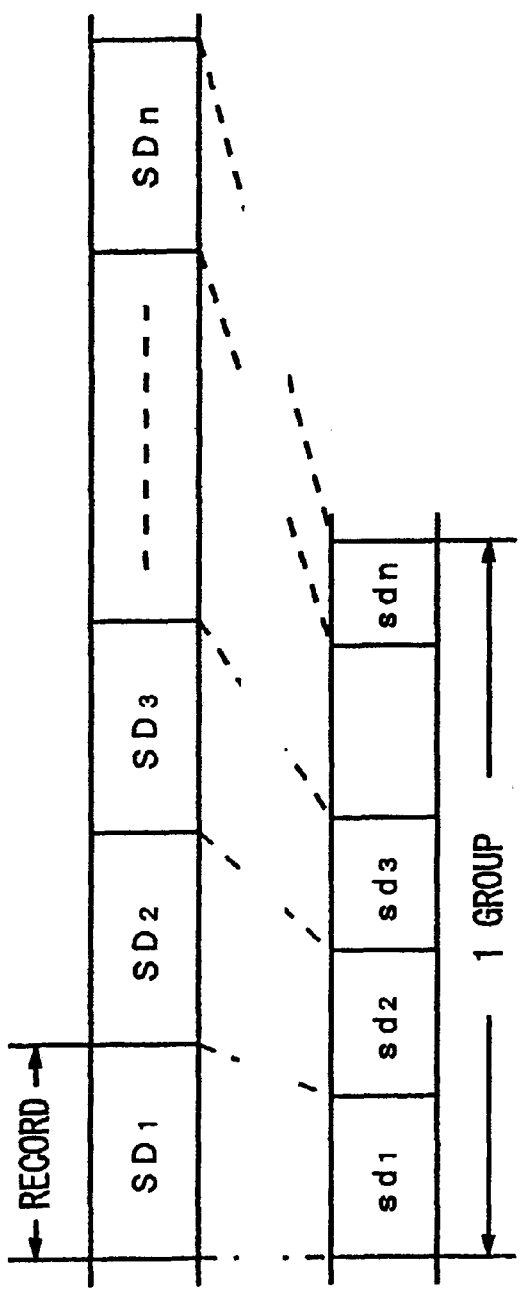
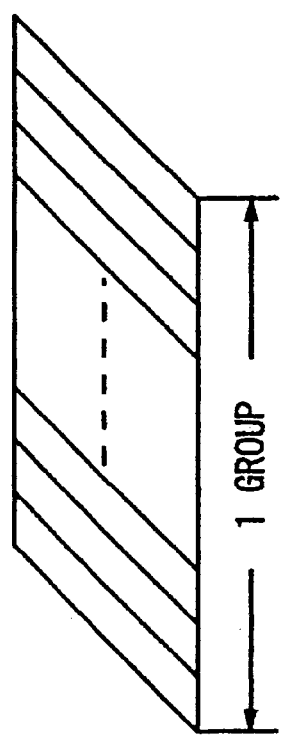
Fig. 1A
Fig. 1B
Fig. 1C

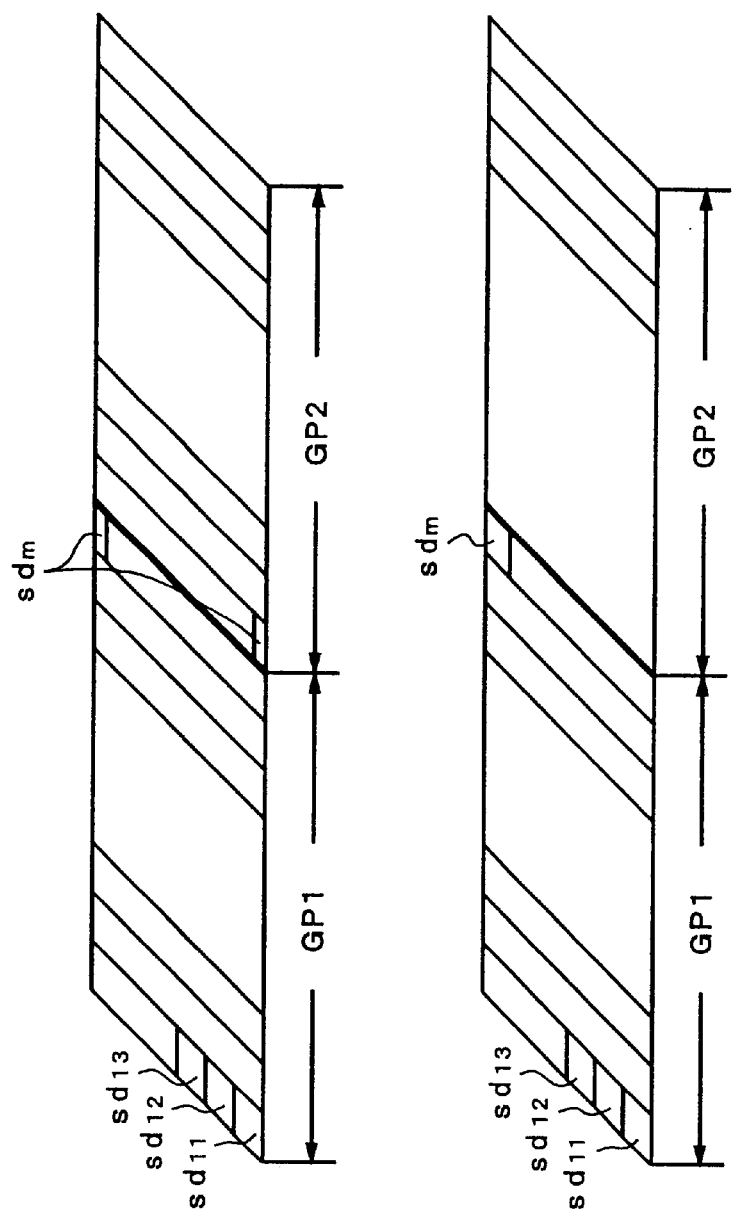

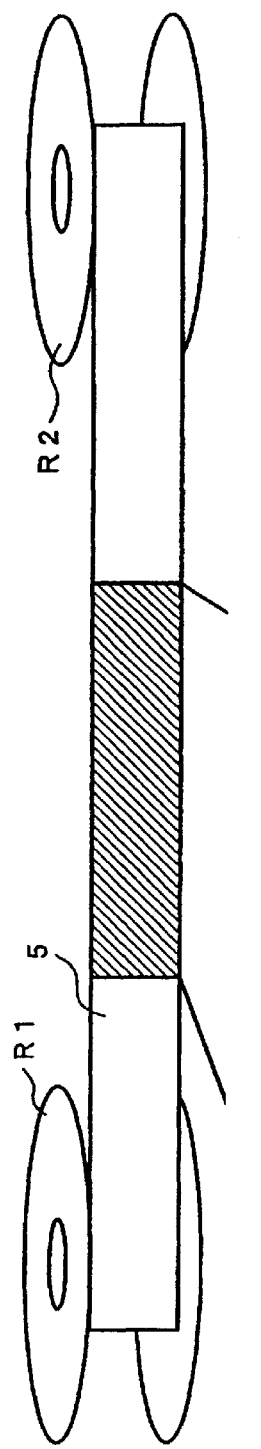
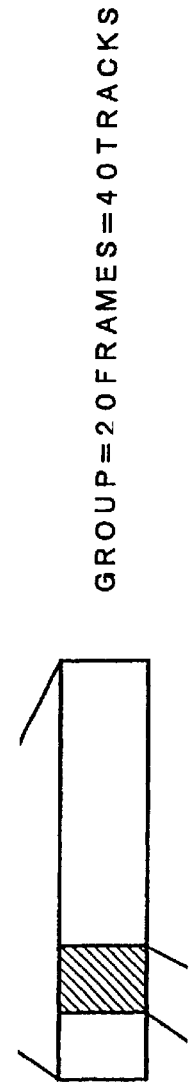
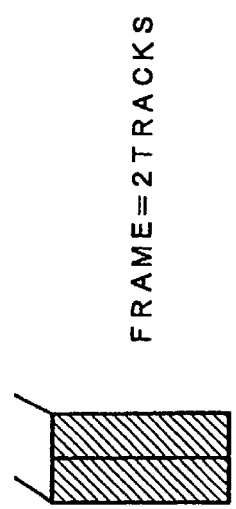
Fig. 4A
Fig. 4B
Fig. 4C
Fig. 4D

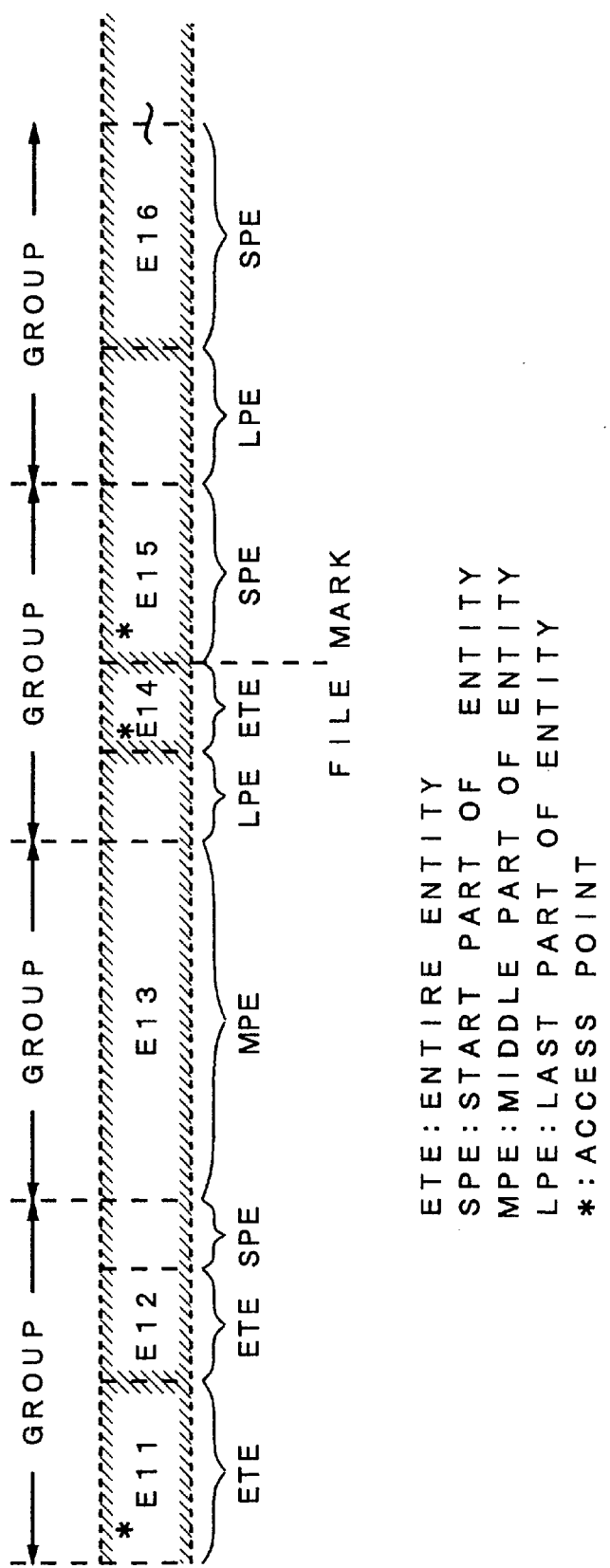

Entity Map Structure

Algorithm Number Definition

| Algorithm Number | Definition |
|---|---|
| 0 | There is no Access Point |
| 1 | Unprocessed Data |
| 2 | Reserved |
| 3 | Processed by ALDC-1 Data Compression |
| 4 - 3 1 | Reserved |
| 3 2 | Processed by DCLZ Data Compression |
| 3 3 · 2 5 5 | Reserved |

Fig. 13

BAT: Access Entries

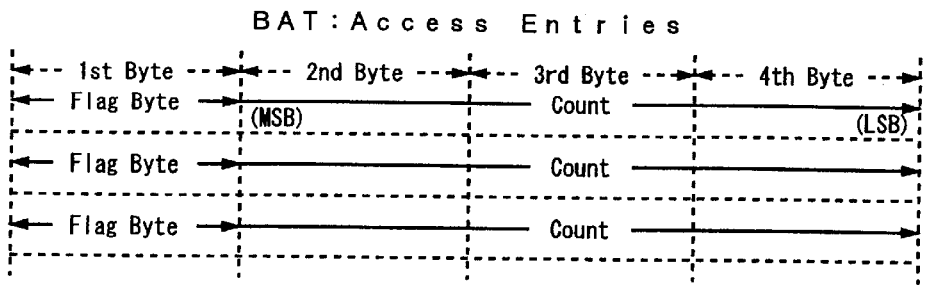

Fig. 14

BAT Flag Value Definition

| BAT Flag Number | Definition |
|---|---|
| 0 (00000000) | reserved |
| 1 (00000001) | Entire Entry |
| 2 (00000010) | Start Part of Entry |
| 3 (00000011) | Middle Part of Entry |
| 4 (00000100) | Last Part of Entry |
| 5 (00000101) | Total Count of Entry |
| 6 (00000110) | Entire Unprocessed Entry |
| 7 (00000111) | Start Part of Unprocessed Entry |
| 8 (00001000) | Middle Part of Unprocessed Entry |
| 9 (00001001) | Last Part of Unprocessed Entry |
| 10 (00001010) | Total Count of Unprocessed Entry |
| 11 (00001011) | Separator Mark Entry |
| 12 (00001100) | Skip Entry |
| 13 to 127 | reserved |
| -128 (10000000) | reserved (with AEWP) |
| -127 (10000001) | Entire Entry (with AEWP) |
| -126 (10000010) | Start Part of Entry (with AEWP) |
| -125 (10000011) | Middle Part of Entry (with AEWP) |
| -124 (10000100) | Last Part of Entry (with AEWP) |
| -123 (10000101) | Total Count of Entry (with AEWP) |
| -122 (10000110) | Entire Unprocessed Entry (with AEWP) |
| -121 (10000111) | Start Part of Unprocessed Entry (with AEWP) |
| -120 (10001000) | Middle Part of Unprocessed Entry (with AEWP) |
| -119 (10001001) | Last Part of Unprocessed Entry (with AEWP) |
| -118 (10001010) | Total Count of Unprocessed Entry (with AEWP) |
| -117 (10001011) | Separator Mark Entry (with AEWP) |
| -116 (10001100) | Skip Entry (with AEWP) |
| -115 to -1 | reserved (with AEWP) |

DIGITAL DATA RECORDING AND REPRODUCING APPARATUS HAVING RECORD OVERFLOW DETERMINING MEANS

TECHNICAL FIELD

The present invention relates to a data recording/reproducing apparatus for recording/reproducing digital data to/from a tape-shaped record medium. In particular, the present invention relates to an apparatus for compressing data and recording/reproducing compressed data to/from a magnetic tape with a rotating head in helical scanning method.

BACKGROUND ART

Since a tape streamer drive that records and reproduces digital data to/from a magnetic tape has a huge storage capacity, it has been widely used so as to back up data stored in a storing device such as a hard disk or the like. In addition, the tape streamer drive is suitable for recording a large file that contains moving picture data.

In such a tape streamer drive, digital data is recorded/reproduced to/from a magnetic tape in helical scan method with a rotating head using a tape cassette similar to an 8-mm type tape cassette.

To increase data record capacity, a tape streamer driver that compresses and records data with LZ (Lempel-ZIV) code has been proposed.

When data is compressed and recorded, the record capacity of data increases. In particular, when sequential data is recorded/reproduced, since the data amount to be read/written decreases, the access speed apparently increases.

To accomplish such a data compressing function, the tape streamer drive is provided with a data compressing/expanding portion that compresses/expands data of for example LZ code. Normally, the data compressing/expanding portion has an original data side interface, a compressing/expanding engine, and a compression data side interface. Each of the original data side interface and the compression data side interface has an FIFO (First-In-First-Out) register that adjusts the DMA (Direct Memory Access) transmission speed.

When such a tape streamer drive records data, it receives the data from a host computer through the original data side interface. The data is sent as records (composed of 512 bytes each). The data is supplied to the data compressing/expanding engine. The data compressing/expanding engine successively compresses the data. The compressed data is recorded as groups (composed of several tracks each) on the magnetic tape.

As shown in FIG. 1A, data records $SD_1$, $SD_2$, $SD_3$, and so forth are input to the original data side interface. The data records $SD_1$, $SD_2$, $SD_3$, and so forth are supplied to the data compressing/expanding engine. As shown in FIG. 1B, the data compressing/expanding engine compresses the data records $SD_1$, $SD_2$, $SD_3$, and so forth into compressed data records $sd_1$, $sd_2$, $sd_3$, and so forth. A buffer memory is disposed just after the data compressing/expanding portion. The compressed data records $sd_1$, $sd_2$, $sd_3$, and so forth are temporarily stored in the buffer memory. When the data amount of the compressed data records $sd_1$, $sd_2$, $sd_3$, and so forth becomes the amount of data for one group, as shown in FIG. 1C, the data is recorded to a group that is composed of a predetermined of tracks.

In the data reproduce mode, data is reproduced as groups from the magnetic tape. The reproduced data is temporarily stored in the buffer memory. When the data amount stored in the buffer memory becomes the data amount for one group, the data is supplied to the data compressing/expanding portion. The data compressing/expanding portion expands the reproduced data to original data. For example, data is supplied as records (composed of 512 bytes each) to the host computer.

As described above, in the tape streamer drive of which data is compressed and then recorded on a magnetic tape, data that has been input as records from the host computer is compressed and then stored in the buffer memory. Since the data that has been compressed is variable length data and the compression rate of data varies depending on the type thereof, it is difficult to predict the amount of data that has been compressed. Thus, the buffer memory may overflow.

In other words, in the record mode, the host computer designates the record length and the number of records of data to be sent to the tape streamer drive. Since the amount of data compressed cannot be predicted, when the data with the designated record length is compressed for the number of records being designated and stored in the buffer memory, the buffer memory may overflow. When the buffer memory overflows, a control for temporarily suspending the transmission of data from the host computer is required.

In the tape streamer drive that compresses data and records the compressed data to the magnetic tape, in the reproduce mode, the tape streamer drive reproduces data as groups from the magnetic tape and stores the reproduced data in the buffer memory. When data of a predetermined unit (for example composed of a plurality of records) continues to the next group, the data of the next group should be read.

In other words, as shown in FIGS. 2A and 2B, when data elements (of a predetermined unit) $sd_{11}$, $sd_{12}$, $sd_{13}$, and so forth are recorded, a data element $sd_m$ at the last of a group GP1 may continue to the group GP1 (see FIG. 2A) or be completed in the next group GP2 (see FIG. 2B). In the case that the data $sd_m$ at the last of the group GP1 is completed in the group GP1, by accessing the group GP1, the data of the group GP1 can be completely reproduced. On the other hand, as shown in FIG. 2A, when the data $sd_m$ at the last of the group GP1 continues to the group GP2, to reproduce the data $s_m$, the next group GP2 should be also accessed.

Thus, in the data recording/reproducing apparatus that compresses data and records the compressed data to the magnetic tape, the data transmission of the host computer should be controlled so that the buffer does not overflow. In the reproduce mode, data accessing process should be controlled depending on whether or not data of a predetermined unit is completed in one group.

DISCLOSURE OF THE INVENTION

Therefore, an object of the present invention is to provide a digital data recording apparatus that allows data supplied from the host computer to be effectively compressed and recorded and prevents a buffer memory from overflowing with the data.

Another object of the present invention is to provide a digital data reproducing apparatus that can obtain information for determining whether or not data continues to the next block and that effectively performs an expanding process with the obtained information.

The present invention is a digital data recording apparatus, comprising an inputting means for inputting digital data of a predetermined unit, a buffer memory for temporarily storing digital data corresponding to a record unit of a record medium, a recording means for recording the digital data stored in the buffer memory to the record medium in the record unit of the record medium, a determining means for determining whether or not the digital data in the predetermined unit continues to the next record unit of the record medium when the digital data stored in the buffer memory is recorded to the record medium, and an identification signal adding means for adding an identification signal to the record medium corresponding to the determined result of the determining means.

The present invention is the digital data recording apparatus further comprising a data compressing means for compressing the input digital data, and a memory controlling means for temporarily storing the compressed digital data corresponding to a group unit having a fixed length to the buffer memory, wherein the recording means records the digital data stored in the buffer memory to the record medium in the group unit.

The present invention is the digital data recording apparatus further comprising a data amount designating means for designating the amount of digital data that is input in the predetermined unit, a buffer capacity detecting means for detecting whether or not the buffer memory becomes full, and a means for changing a designated value of the data designating means when the buffer capacity detecting means detects that the buffer memory becomes full.

The present invention is a digital data reproducing apparatus, comprising a reproducing means for reproducing data for each record unit from the record medium on which the digital data has been recorded for each record unit, a buffer memory for temporarily storing the digital data reproduced for each predetermined unit from the record medium, an outputting means for processing the digital data read from the buffer memory and outputting the digital data in a predetermined unit other than the record unit, a detecting means for detecting an identification signal for determining whether or not the digital data in the predetermined unit continues to the next record unit of the record medium, and a controlling means for controlling whether or not to reproduce the digital data in the record unit of the next record medium corresponding to the output of the detecting means.

BRIEF DESCRIPTION OF DRAWINGS

FIGS. 1A to 2B are schematic diagrams for explaining a conventional recording/reproducing apparatus;

FIGS. 4A to 4D are schematic diagrams showing the data structure of one partition recorded on a magnetic tape;

FIGS. 8A to 9 are schematic diagrams for explaining an entity;

FIGS. 13 and 14 are schematic diagrams for explaining a BAT;

BEST MODES FOR CARRYING OUT THE INVENTION

Figure 3:
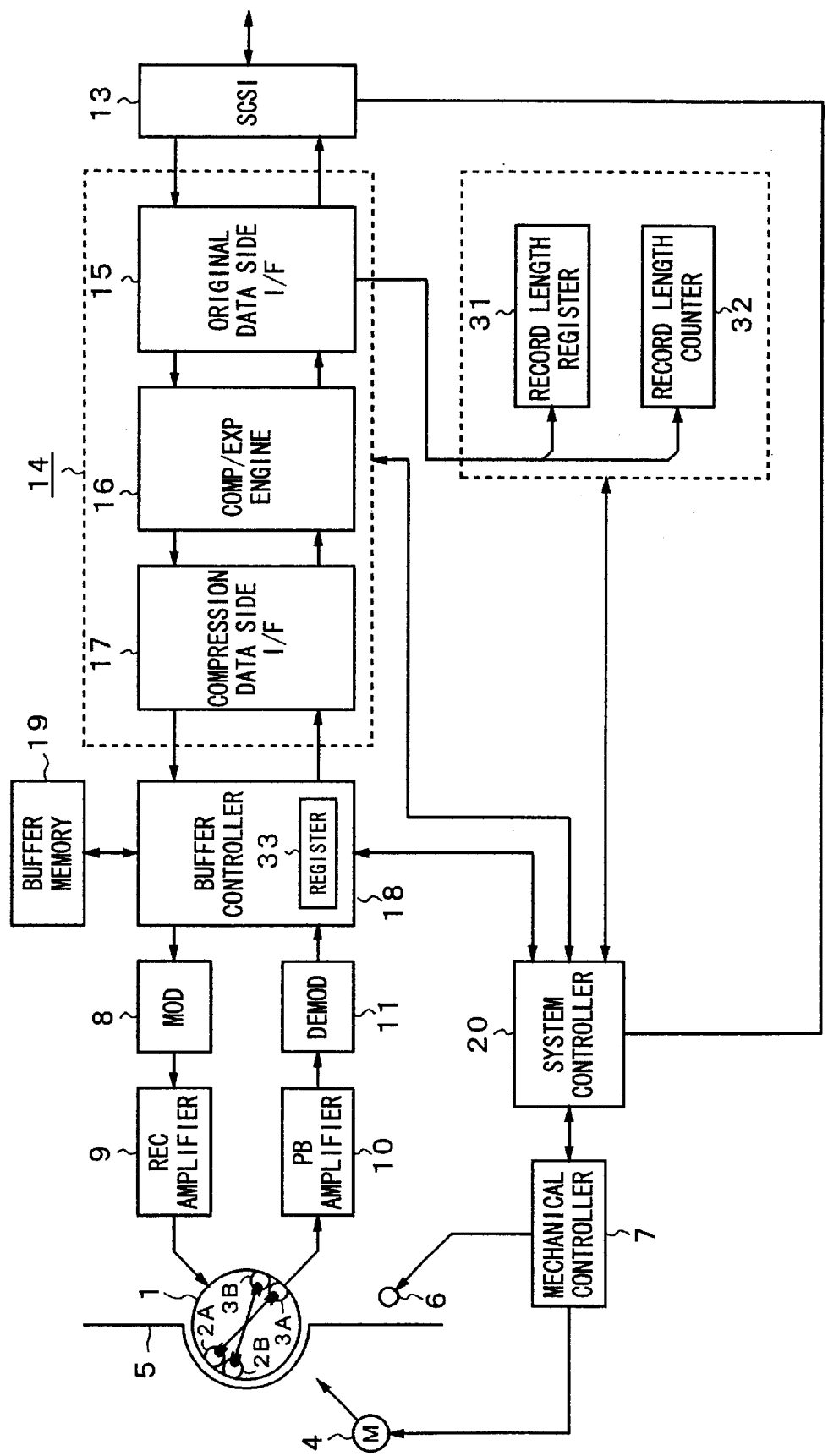
FIG. 3 is a block diagram showing an example of a tape streamer drive according to the present invention.

Next, with reference to the accompanying drawings, an embodiment of the present invention will be described. FIG. 3 shows an example of a tape streamer drive according to the present invention. The tape streamer drive records/reproduces data to/from a magnetic tape that is the same as a tape for an 8-mm VCR in helical scanning method.

In FIG. 3, reference numeral 1 is a rotating drum. The rotating drum 1 has recording heads 2A and 2B and reproducing heads 3A and 3B. The recording heads 2A and 2B are formed as a double azimuth structure having gaps that are closely disposed with different azimuth angles. Likewise, the reproducing heads 3A and 3B are formed as a double azimuth structure.

The magnetic tape 5 is pulled out from the tape cassette and wound around the rotating drum 1. The rotating drum 1 is rotated by a drum motor 4. The magnetic tape 5 is supplied by a capstan motor 6 and a pinch roller (not shown). The drum motor 4 and the capstan motor 6 are rotated under the control of a mechanical controller 7. The mechanical controller 7 performs a drum servo process and a tracking servo process. The mechanical controller 7 is bi-directionally connected with a system controller 20 that controls the entire system.

With the rotating drum 1 having the recording heads 2A and 2B and the reproducing heads 3A and 3B, data is recorded/reproduced in the helical scanning method. In other words, record data for the magnetic tape 5 is modulated by a modulating circuit 8 and supplied to the recording heads 2A and 2B. Since the recording heads 2A and 2B have different azimuth angles, the helical tracks alternately have different azimuth angles.

Data of the magnetic tape 5 is reproduced with the reproducing heads 3A and 3B. Output data of the reproducing heads 3A and 3B is supplied to the demodulating circuit 8 through a reproducing amplifier 10. The demodulating circuit 11 demodulates the reproduction data.

In the tape streamer drive, data is input/output through the SCSI interface (Small Computer System Interface). In other words, in the record mode, data is supplied as records (composed of for example 32 kbytes each) from a host computer (not shown). This data is input through a SCSI interface 13.

The tape streamer drive has a data compressing/expanding portion 14 that compresses/expands data. The data compressing/expanding portion 14 is composed of an original data side interface 15, a data compressing/expanding engine 16, and a compression data side interface 17. Data is supplied to the data compressing/expanding portion 14 in DMA method. Each of the original data side interface 15 and the compression data side interface 17 has an FIFO (First-In First-Out) that adjusts the DMA transmission.

The data compressing/expanding engine 16 compresses/expands data corresponding LZ coding method. In the LZ coding method, the repetition of an input character sequence is detected and data is compressed corresponding to the repetition. For example, unique codes are assigned to character strings that have been processed and stored in a dictionary form. The input character string is compared with the dictionary. When they match, the input character string is converted into a relevant code in the dictionary. When they do not match, the input character string is successively registered to the dictionary. In such a manner, input character strings are registered to the dictionary and the character strings are converted into relevant codes in the dictionary so as to compress data.

The streamer drive has a record length register 31 and a record number counter 32. The record length register 31 and the record number count 32 designate the record length of the original data and the number of records thereof. The contents of the record length register 31 and the record counter 32 are read/written by the system controller 20.

When data is recorded, the host computer designates the record length and the number of records to the record length register 31 and the record number counter 32. The host computer supplies data as records (composed of for example 512 bytes each) to the tape streamer drive. This data is input through the SCSI interface 13. Output data of the SCSI interface 13 is supplied to the data compressing/expanding engine 16 through the original data side interface 15. The data is compressed with the LZ code by the data compressing/expanding engine 16. Output data of the data compressing/expanding engine 16 is output through the compression data side interface 17.

Output data of the compression side interface 17 is temporarily stored in the buffer memory 19 under the control of the buffer controller 18. Data for one group is stored in the buffer memory 19. Output data of the buffer memory 19 is supplied to the modulating circuit 8. Output data of the modulating circuit 8 is supplied to the recording heads 2A and 2B through a recording amplifier 9. Data is recorded on helical tracks with the recording heads 2A and 2B.

In the reproduce mode, record data on the magnetic tape 5 is reproduced by the reproducing heads 3A and 3B. Output data of the reproducing heads 3A and 3B is supplied to the modulating circuit 11 through 10 reproducing amplifier 10. The demodulating circuit 11 demodulates reproduction data. Output data of the demodulating circuit 11 is temporarily stored in the buffer memory 19 under the control of the buffer controller 18. The buffer memory 19 stores data for one group.

Output data of the buffer memory 19 is supplied to the data compressing/expanding engine 16 through the compression data side interface 17 of the data compressing/ expanding portion 14. The data compressing/expanding engine 16 expands the data to the original data. Output data of the data compressing/expanding engine 16 is supplied to the SCSI interface 13 through the original data side interface 15. Output data of the SCSI interface 13 is supplied to the host computer.

FIGS. 4A to 4D are schematic diagrams showing the data structure of the magnetic tape 5. The tape streamer drive according to the present invention can manage one magnetic tape as a plurality of partitions. In other words, as shown in FIG. 4A, the magnetic tape 5 is wound between reels R1 and R2. As shown in FIG. 4B, one magnetic tape can be divided into up to 256 partitions. As shown in FIG. 4C, data is recorded as groups of a fixed length unit in each partition on the magnetic tape 5.

Next, the record format of the tape by the tape streamer drive according to the present invention will be described.

Figure 5:
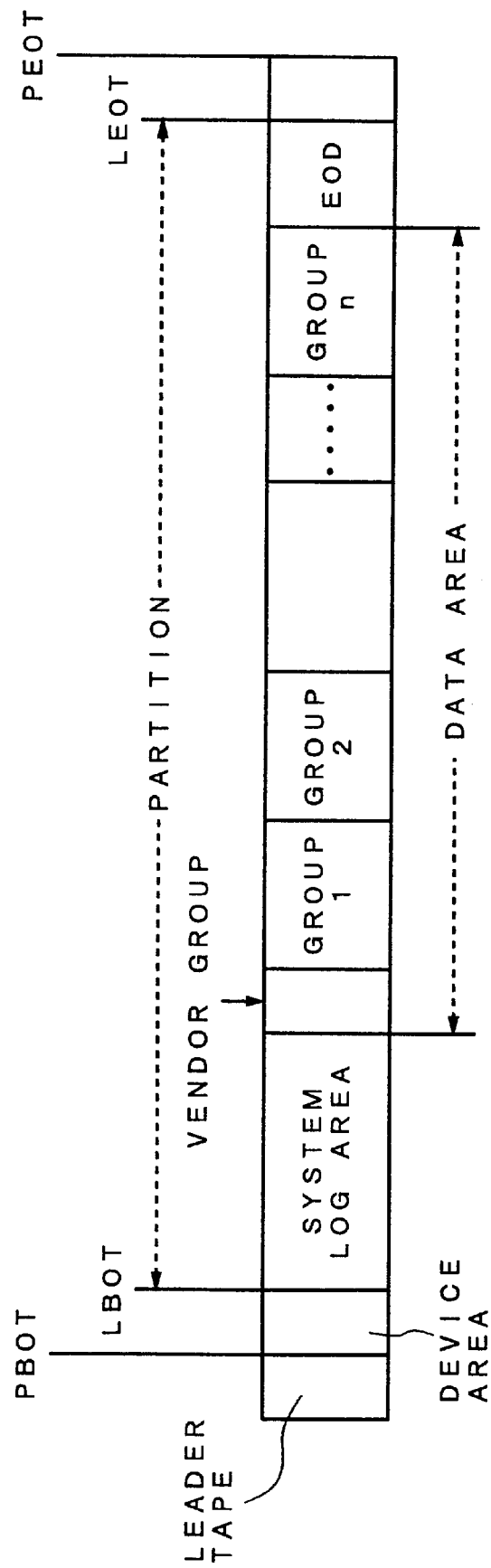
FIGS. 5 to 7 are schematic diagrams for explaining a tape record format of the example of the tape streamer drive according to the present invention.

FIG. 5 shows the structure of one partition. In FIG. 5, one partition is formed for the full tape length. As shown in FIG. 5, a leader tape is disposed at the top portion of the magnetic tape. Thereafter, a device area as an area for loading/ unloading the tape cassette is formed. The top portion of the device area is PBOT (Physical Beginning of Tape).

The device area is followed by a system log area that stores use history information of the tape and so forth. Thereafter, a data area is formed. The top of the system log area is LOBOT (Logical Beginning of Tape).

The data area has a vendor group that represents information of a vendor of the data. Thereafter, data for groups 1 to n is recorded. The last group n is followed by an EOD (Logical End of Tape) area that represents the last of the partition. The last of the EOD is LEOT (Logical End of Tape). PEOT (Physical Ending of Tape) represents the last of the tape.

Figure 6A:
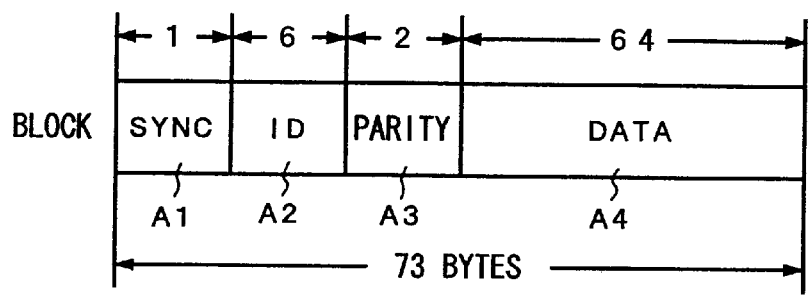

Data is recorded on each track in a block structure as shown in FIG. 6A. One block is composed of a SYNC data A1 of one byte, an ID data A2 of six bytes, a parity A3 of two bytes, and data A4 of 64 bytes. The ID data A2 is used to search data. The parity A3 is used to detect an error of the ID data A2.

Figure 6B:
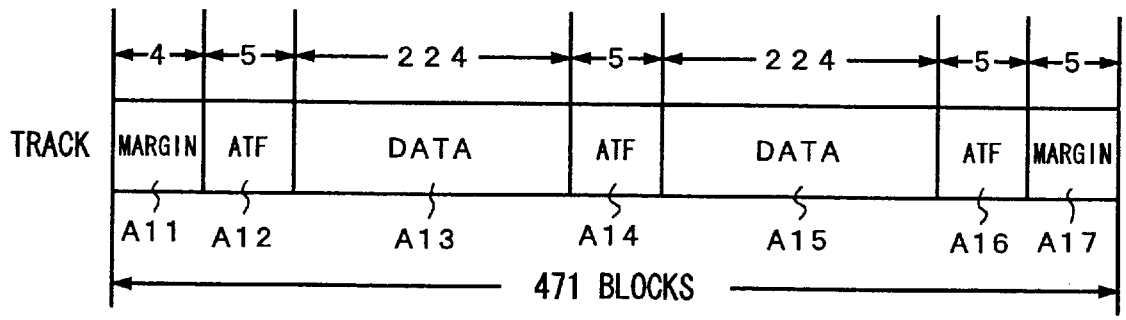

As shown in FIG. 6B, one track is composed of 471 blocks that are margins A11 and A17 of four blocks each, ATF areas A12 and A16 of five blocks each, data A13 and A15 of 224 blocks each, and an ATF area A14. The ATF area is used for tracking control.

Figure 7:
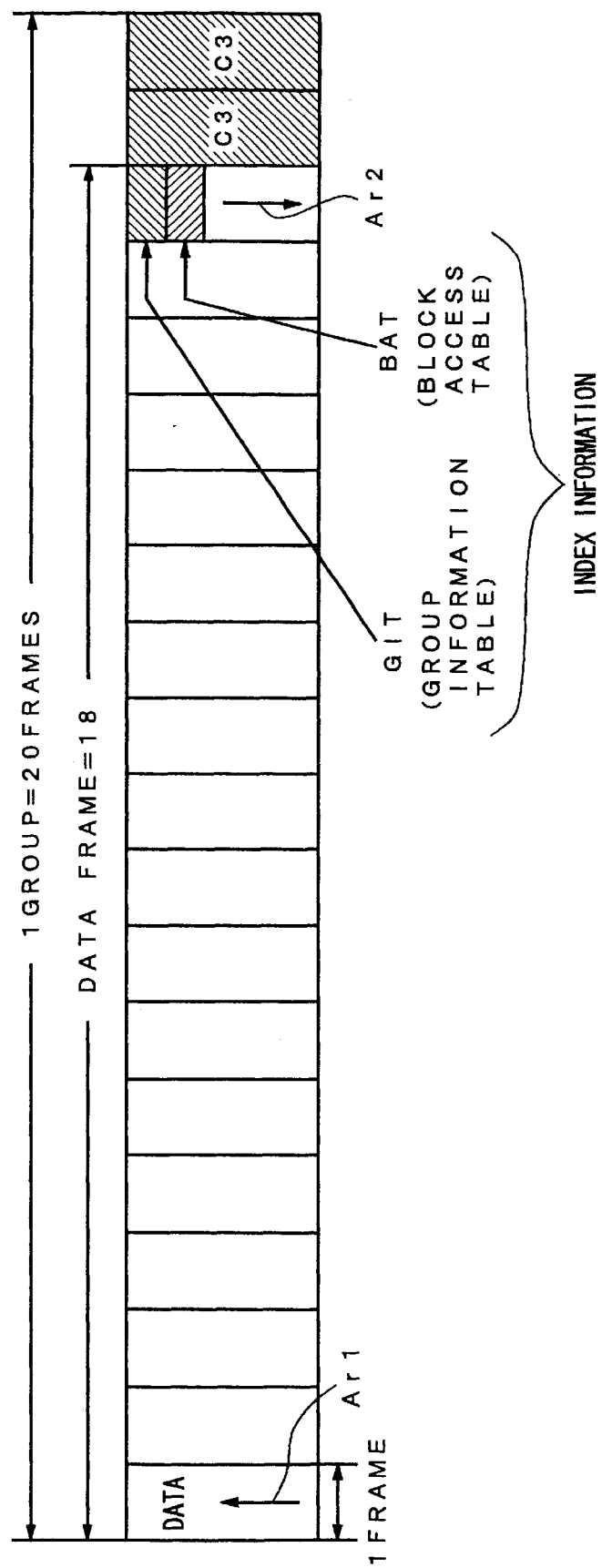

FIG. 7 shows a data structure of one group. As described above, one group is composed of 20 frames (40 tracks). As shown in FIG. 7, a C3 parity area is placed at the last two frames of the 20 frames that compose one group. The C3 parity is used to correct an error. C1 and C2 parities are placed to data for each track shown in FIG. 6 (the description of the C1 and C2 parities is omitted).

In the record mode, as denoted by an arrow Ar1, data is successively written from the top frame of the data group. On the other hand, index information is written in the reverse direction of data from the 18-th frame as denoted by an arrow Ar2.

The index information is categorized as a GIT (Group Information Table) and a BAT (Block Access Table). The GIT represents the contents of the current group. The BAT represents management information for each entity. The GIT has a fixed length of for example 40 bytes. The BAT is composed of access entities of four bytes each. The BAT has a fixed length that varies corresponding to the contents of the group. The index information will be described later.

Figures 8A, 8B, 8C:
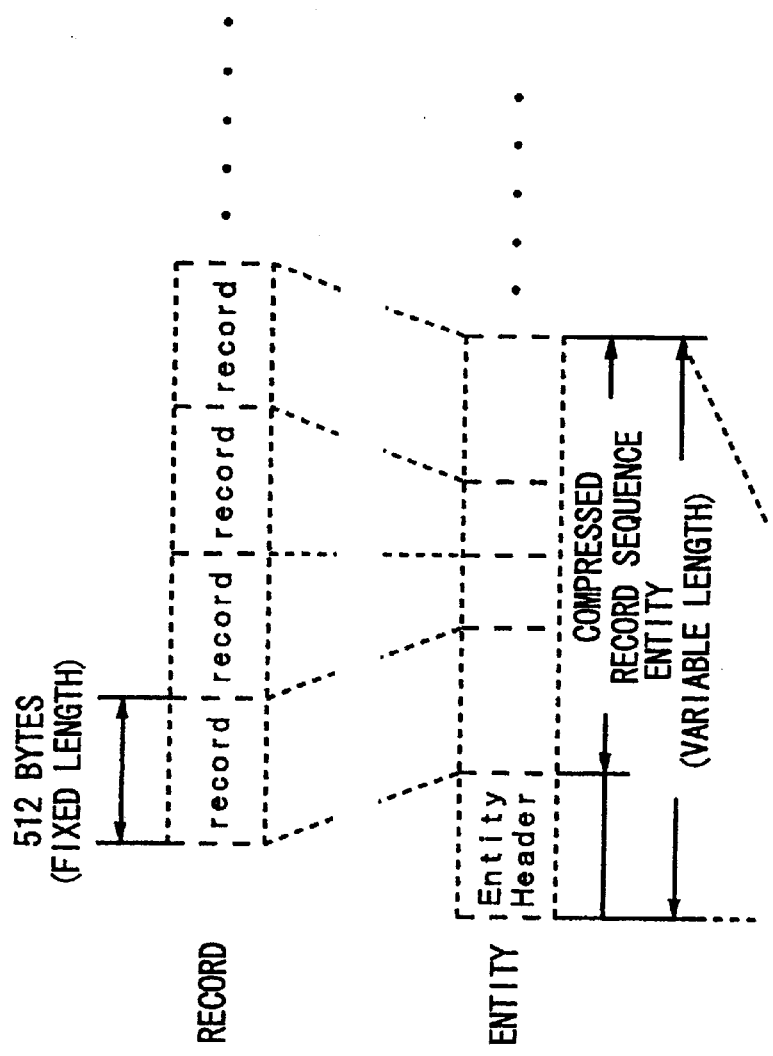

An entity is a unit for managing data of each record being compressed. An entity is composed of data of a plurality of records being compressed. In other words, when records as shown in FIG. 8A are successively input to the tape streamer drive and compressed, the data size of each record varies depending on the contents thereof. In this case, before data is grouped, an entity as shown in FIG. 8B is composed of a predetermined number of records being compressed.

In FIG. 8B, one entity is composed of four records. However, the number of records that compose one entity is not limited to four.

As shown in FIG. 8B, at the top of each entity, an entity header that represents the contents of data of the entity is formed. Next, a plurality of records being compressed are placed. The contents of the entity header will be described later.

After records are formed as entities, as shown in FIG. 8C, data is grouped with a plurality of entities E1, E2, E3, and E4. In this case, an access entry of the is created for each entity.

As with entities E11, E12, E13, E14, and E15 shown in FIG. 9, depending on the data length and start position of each of entities, some entities are completed in one group, whereas other entities continue in two or more successive groups. For example, the former type entities are E11, E12, and E14. The latter type entities are E13, E15, and E16. The former type entities are referred to as ETE (Entire Entity). With respect to the latter type entities, the former portion and the latter portion are referred to as SPE (Start Part of Entity) and LPE (Last Part of Entity), respectively. In addition, with respect to an entity that continues in three successive groups, for example E13, the portion in the first group is referred to as SPE (Start part Entity). The portion in the second group is referred to as MPE (Middle Part of Entity). The portion in the third group is referred to as LPE (Last Part of Entity).

A "File Mark" is placed between the entity E14 and the entity E15. The "File Mark" represents a delimiter of a data file. Thus, the entity E15 belongs to another file. Whenever a save (record) operation is performed, a save-set mark is placed.

An asterisk "*" placed at the top of each of the entities E11, E14, and E15 represents an access point. When an attribute such as LBOT, separator mark (file mark or save-set mark), or algorithm is changed, the asterisk "*" is placed at the top of the first record of the entity.

Figures 10, 11:
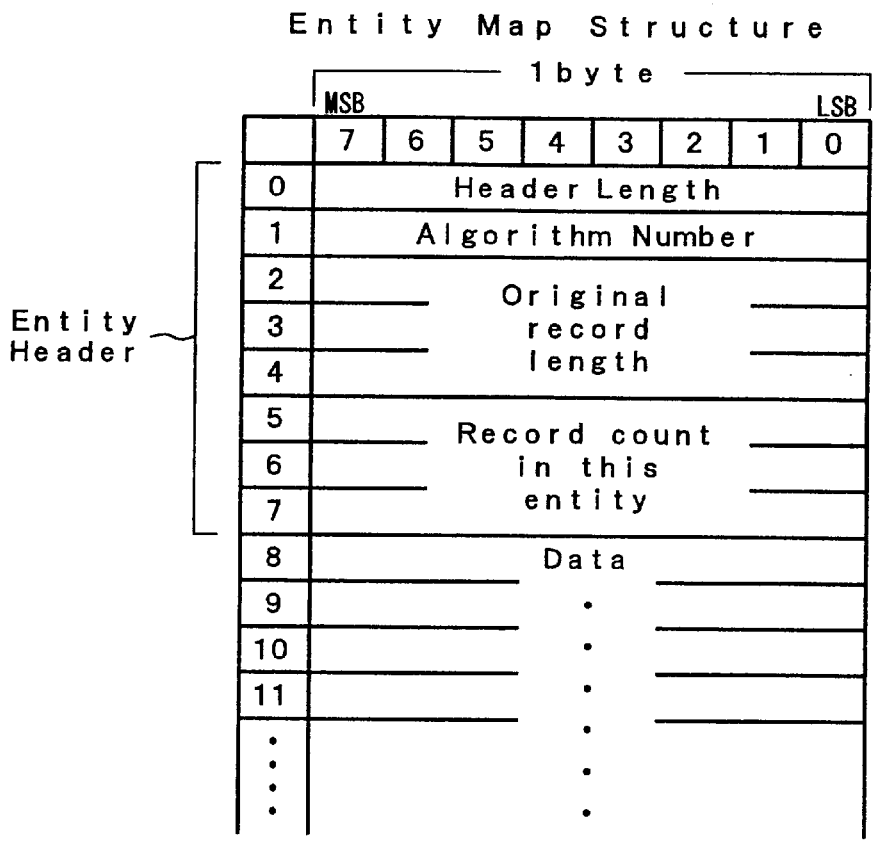
FIGS. 10 and 11 are schematic diagrams for explaining an entity map.

Next, the structure of an entity will be described in detail. FIG. 10 shows the structure of an entity. As shown in FIG. 10, an entity header is formed at the top of the entity. The entity header is composed of an area of eight bytes from byte 0 to byte 7. The byte 0 represents "Header Length". The "Header Length" represents the data length of the entity header. When the current entity has an access point, a record starts from byte n. The byte n is defined by the "Header Length".

The byte 1 represents an "Algorithm Number" in binary notation. For example, the algorithm number is defined as shown in FIG. 11. When the algorithm number is "0", the current entity does not have an access point. When the algorithm number is "1", the current entity has an access point and records of the current entity are non-compressed data. When the algorithm number is "3" or "32", the current entity has an access point and data therein has been compressed corresponding to a predetermined method.

The algorithm numbers "2", "4" to "31", and "33" to "255" are reserved.

An area of byte numbers 2 to 4 represents an "Original record Length". In this case, as described earlier, the original record length is 512 bytes.

An area of byte numbers 5 to 7 is a "Record count in this Entity" that represents the number of records included in the current entity. When the current record has a file mark and a save-set mark, they are included in the number of records.

An area after byte 8 stores data of a record sequence. In such a manner, one entity is formed.

As described above, one group has a GIT (Group Information Table) and a BAT (Block Access Table) as index information. Next, the index information will be further described.

Figure 12:
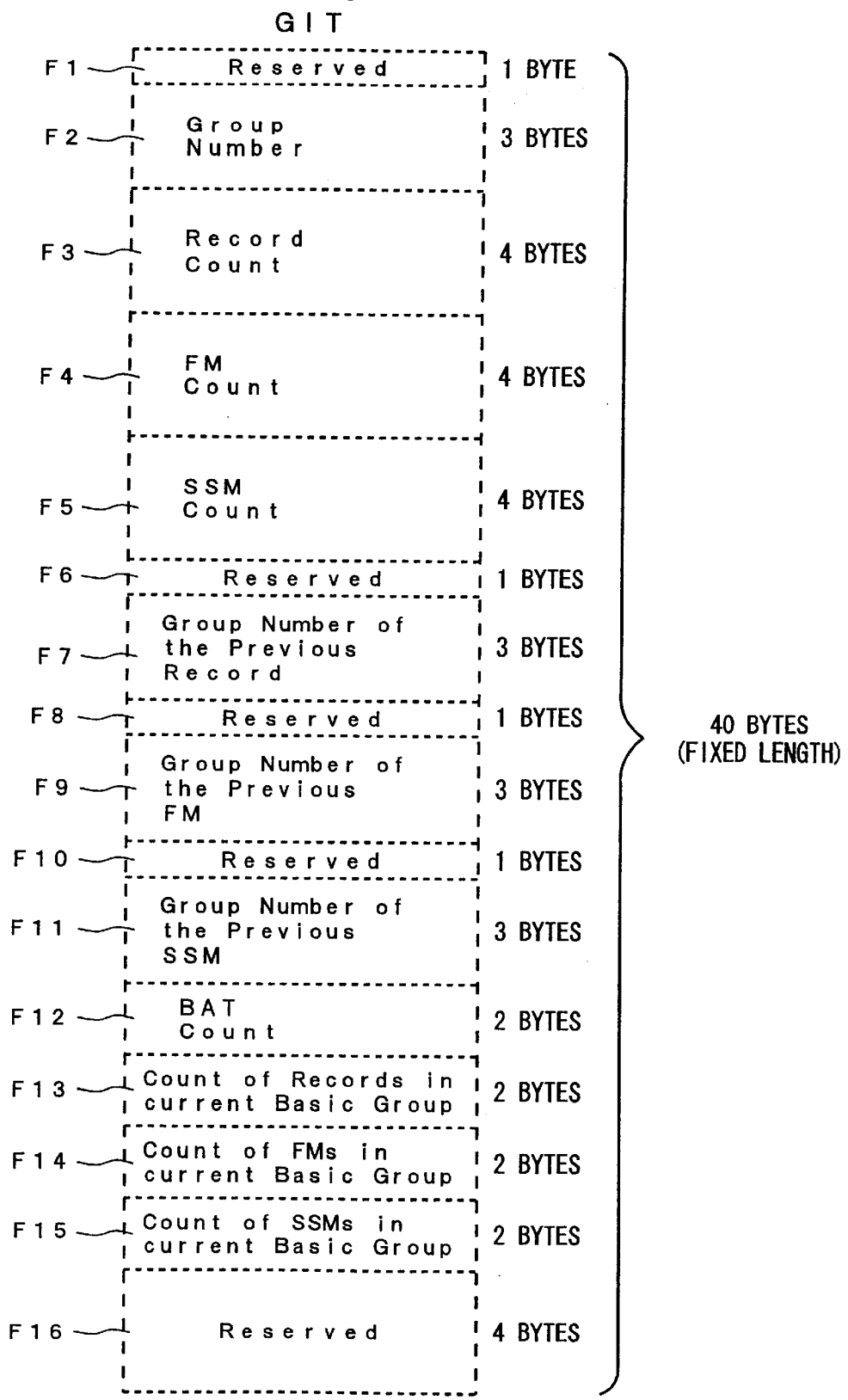
FIG. 12 is a schematic diagram for explaining a GIT.

FIG. 12 shows the structure of the GIT. As described above, the GIT has a fixed length of for example 40 bytes. As will be described in the following, the GIT stores management information of the current group. The GIT has fields F1 to F16 as shown in FIG. 12.

With respect to the fields F1 to F12, the field F2 is a "Group Number" field of three bytes. The field F2 stores group number information uniquely designated to the current group.

The field F3 is a "Record count" field of four bytes. The field F3 stores information of the total number of records contained in the current group after LBOT.

The field F4 is a "File Mark Count" field of four bytes. The field F4 stores information of the total number of file marks contained in the current group after LBOT. Likewise, the field F5 is a "Save-Set Mark Count" field of four bytes. The field F5 stores information of the total number of save-set marks contained in the current group after LBOT.

The field F7 is a "Group Number of the Previous Record" field of three bytes. The field F7 stores information of a group number of the last group that contains a file mark, a save-set mark, or the first record.

The field F9 is a "Group Number of Previous File Mark" field of three bytes. The field F9 stores information of a group number of a group that contains a file mark that has been recorded last. The field F11 is a "Group Number of the Previous Save-Set Mark" field of three bytes. The field F11 stores information of a group number of a group that contains a save-set mark that has been recorded last.

The field F12 is a "Block Access Table Count" field of two bytes. The field F12 stores information of the number of access entries of the BAT of the current group. The BAT is composed of access entries of four bytes each.

The field F13 is a "Count of Record in current Basic Group" field of two bytes. The field F13 stores information of the number of records of the current group. In this case, the number of records includes the number of file marks and the number of save-set marks in the current group.

The field F14 is a "Count of File Mark in current Basic Group" field of two bytes. The field F14 stores information of the number of file marks in the current group. The field F15 is a "Count of Save-Set Mark in current Basic Group" of two bytes. The field F15 stores information of the number of save-set marks in the current group.

The fields F1, F6, F8, F10 (one byte each) and F16 (of four bytes) are reserved.

Next, the structure of the BAT will be described. The BAT is composed of one or more access entries. Each access entry of the BAT represents information of a record, a file mark, and a save-set mark contained in the current group. Thus, the number of access entries of the BAT varies corresponding to the contents of entities of each group. Thus, the data size of BAT is variable.

As shown in FIG. 13, one access entry is composed of four bytes. The first byte is a flag byte for a BAT flag that defines an access entry. A field of the second to fourth bytes is a count field that represents the contents of the access entry.

When there are a plurality of access entries that compose the BAT, the first access entry is placed just before the GIT. The remaining access entries are successively written in the reverse direction of the data record direction.

The BAT flag at the first byte of an access entry is defined as shown in FIG. 14. Referring to FIG. 14, the BAT flag number is assigned in binary notation.

The BAT flag number 1 (00000001) represents an "Entire Entry". In this case, the entity of the access entry is "Entire Entity (ETE)". In other words, as with the entities E11, E12, and E14 shown in FIG. 9, the entity starts and ends in the current group. The count field represents the number of bytes of the entity. The BAT flag number 2 (00000010) represents a "Start Part of Entry". In this case, the entity of the access entry is a "Start Part of Entity (SPE)" in the current group. The count field represents the number of bytes.

The BAT flag number 3 (00000011) represents a "Middle Part of Entry". In this case, the entity in the current group is a "Middle Part of Entity (MPE)". The count field represents the number of bytes.

The BAT flag number 4 (00000100) represents a "Last Part of Entry". In this case, the entity in the current group is a "Last Part of Entity (LPE)". The count field represents the number of bytes.

The BAT flag number 5 (00000101) represents a "Total Count of Entry". The "Total Count of Entry" is placed just after the "Last Part Entry". Normally, the "Total Count of Entry" and the "Last Part Entry" are placed in the same group. In this case, the count field represents the number of bytes of the entity of the "Last Part Entity".

The BAT flag numbers 6 (00000111) to 10 (00001010) represent an "Entire Unprocessed Entry", a "Start Part of Unprocessed Entry", a "Middle Part of Unprocessed Entry", a "Last Part of Unprocessed Entry", and a "Total Count of Unprocessed Entry", respectively. In particular, when a group that contains entities composed of records that are not compressed is created, these fields are designated corresponding to the contents of the entities in the group.

The contents of the definitions and the contents of the field counts of these fields are basically similar to those of the "Entire Entry", the "Start Part of Entry", the "Middle Part of Entry", the "Last Part of Entry", and the "Total Count of Entry".

The BAT flag number 11 (00001011) represents a "Separator Mark Entry". The access table represents an area of a file mark or a save-set mark. In this case, when the separator mark corresponding to the access table is a file mark, the field count is "0". When the separator mark corresponding to the access table is a save-set mark, the field count is "1".

The BAT flag number 12 (00001011) represents a "Skip Entry". The "Skip Entry" represents the last byte of the user data in the current group. The count field represents the number of remaining bytes of the group. Thus, the minimum value of the count field accords with the total number of bytes in the index information area composed of the GIT and the BAT in the current group.

The BAT number 0 and 013 to 255 are reserved.

The tape streamer drive has a concept of an EWP (Early Warning Point). The EWP is a point for warning the user against the last of the record area of the magnetic tape.

When data that is being recorded exceeds the EWP, information that represents an AEWP (After Early Warning Point) is placed to the access entry.

The MSB of one byte of the BAT flag number is used for the AEWP. When the AEWP bit is "0", the access entry corresponding to the BAT flag numbers 0 to 127 is used. When the AEWP bit is "1", the BAT flag number is changed to −128 to −1 that represent that data that is being recorded exceeds the EWP along with the contents of the definitions of the BAT flag. In FIG. 14, in the definitions of the BAT flag numbers— 128 to −1, "with AEWP" is denoted.

As shown in FIG. 3, the tape streamer drive according to the present invention has the record length register 31 and the record number counter 32. When data is recorded, the record length of data to be supplied to the tape streamer drive is designated to the record length register 31. The number of records of data to be supplied to the tape streamer drive is designated to the record number counter 32. The values in the record length register 31 and the record number counter 32 can be rewritten from the outside.

Whenever each record of data is supplied from the host computer, the value of the record number counter 32 is decremented. With the record number counter 32, the number of records of data being supplied can be detected. When the number of records being supplied becomes the number of records requested by the host computer, the value of the record number counter 32 becomes for example "0". Thus, the host computer stops supplying data.

Since compressed data is variable-length data, before data being supplied becomes the number of records requested by the host computer, the buffer memory 19 may overflow. By comparing the current address of the buffer memory 19 that represents the last position of stored data with the last address of the memory capacity, it can be determined whether or not the buffer memory 19 has overflown. When the current address accords with the last address, it represents that the buffer memory 19 has overflown. Information that represents whether or not the buffer memory 19 overflows is represented with the register 33. When the buffer memory 19 overflows, the value of the record number counter 32 becomes for example "1". Thus, with one data transmission operation, the value of the record number counter 32 becomes "0". Consequently, the host computer stops supplying data.

When the value of the record number counter 32 is changed, data supplied from the host computer can be compressed and recorded in such a manner that the buffer memory does not overflow.

Figure 15:
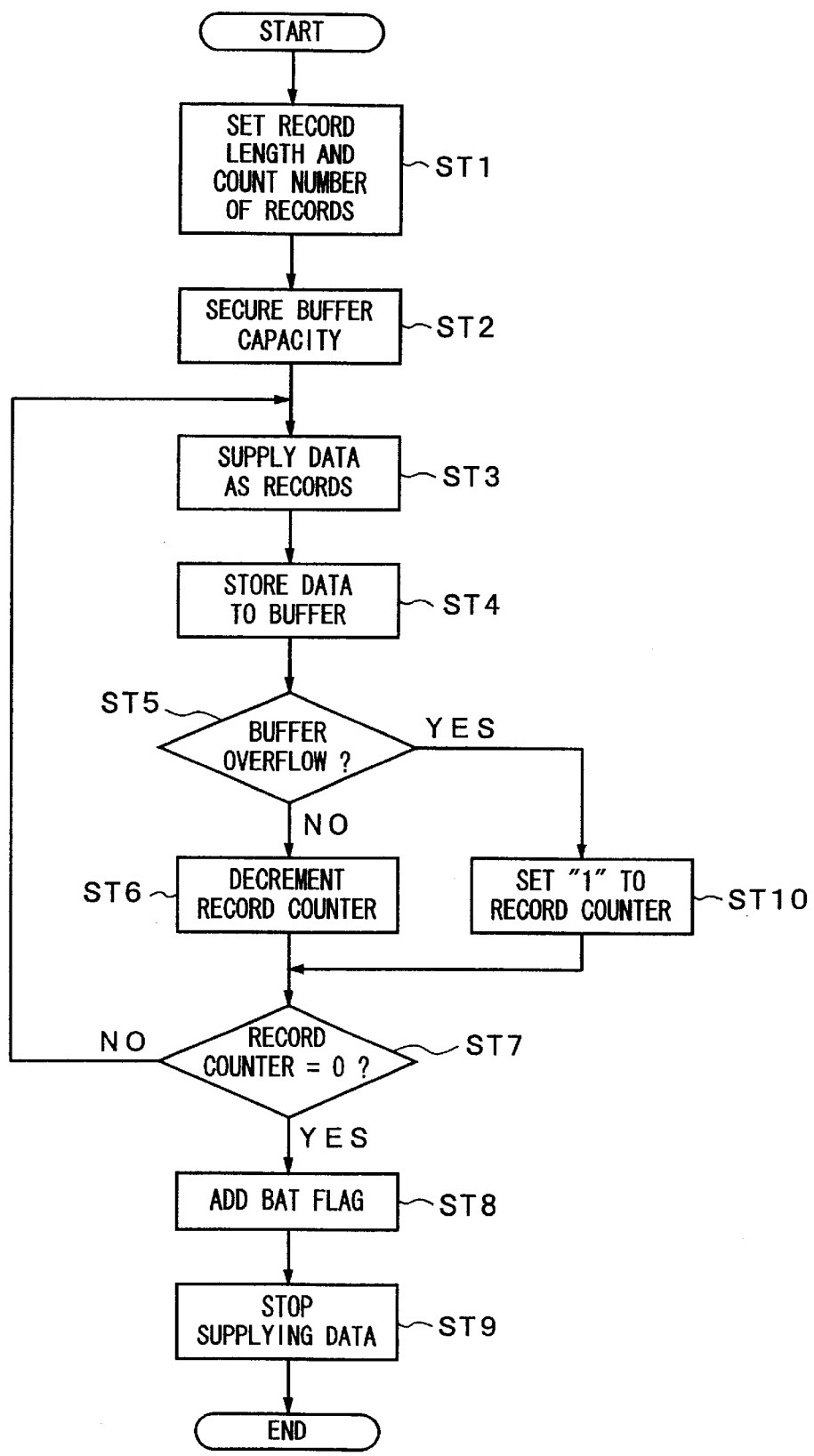
FIG. 15 is a flow chart for explaining a record process of the example of the tape streamer drive according to the present invention.

FIG. 15 is a flow chart showing such a process. In FIG. 15, the system controller 20 designates the record length and the number of records to the record length register 31 and the record number counter 32 corresponding to a command received from the host computer through the SCSI interface 13 (at step ST1). Thereafter, the system controller 20 causes the buffer controller 18 to designate the start address and the last address of the buffer memory 19 (at step ST2). In other words, the buffer memory 19 is controlled by the memory controller 18. The free space (available storage capacity) of the buffer memory 19 is monitored by the register 33 in the buffer controller 18.

The host computer supplies data as records to the tape streamer drive (at step ST3). The data compressing/expanding portion 14 compresses the data. The compressed data is stored in the buffer register 19 (at step ST4). The register 33 of the buffer controller 18 monitors the free space of the buffer memory 19 and determines whether or not the buffer memory has overflown (at step ST5). When the determined result at step ST5 is No, the system controller 20 decrements the record number counter 32 whenever each record of data is compressed (at step ST6). The system controller 20 determines whether or not the value of the record number counter 32 becomes "0" (at step ST7). When the determined result at step ST7 is No, the flow returns to step ST3.

While the flow is cycling from steps ST3 to ST7, the value of the record number counter 32 approaches to "0". During that, unless the buffer memory 19 overflows, the value of the record number counter 32 becomes "0" at step ST7. When the value of the record number counter 32 becomes "0", the system controller 20 adds the BAT flag (at step ST8). Thus, the host computer stops supplying data to the tape streamer drive (at step ST9). When the determined result at step ST5 is No, since all data of records of the current group is recorded, the entity is an "Entire Entity (ETE)" or a "Last Part of Entity (LPE)". Thus, the system controller 20 places the "Entire Entry" or the "Last Part of Entry".

While the flow is cycling from steps ST3 to ST7, when the determined result at step ST5 becomes Yes, the system controller 20 designates "1" to the record number counter 32 (at step ST10). Thus, when the data being supplied is completed, the value of the record number counter 32 becomes "0". When the determined result at step ST7 becomes Yes, the system controller 20 adds the BAT flag (at step ST8). Thus, the host computer stops supplying data to the tape streamer drive (at step ST9). At this point, since the data continues in the next group, the entity becomes a "Start Part of Entity (SPE)" or a "Middle Part of Entity (MPE)". Thus, corresponding to the entity, the system controller 20 adds the BAT flag.

As described above, in the tape streamer drive according to the present invention, when data is recorded, records are formed as entities. The entities are defined as an "Entire Entity (ETE)", a "Start Part of Entity (SPE)", a "Last Part of Entity (LPE)", and a "Middle Part of Entity (MPE)". The BAT flag represents the type of each entity. Corresponding to the type of the entity, the system controller 20 determines whether or not the data is completed in the current group or continues to the next group. Thus, the system controller 20 determines the type of the entity corresponding to the information of the BAT. When the entity continues to the next group, the system controller 20 accesses the next group. Otherwise, the system controller 20 completes the access operation at the current group.

In other words, the "Entire Entity (ETE)" is an entity that is completed in one group. The "Last Part of Entity (LPE)" is a last half portion of an entity that continues in a plurality of groups. When the entity is an "Entire Entity (ETE)" or a "Last Part of Entity (LPE)", the system controller 20 does not need to access the next group. The "Start Part of Entity (SPE)" is a first half portion of an entity that continues in a plurality of groups. The "Middle Part of Entity (MPE)" is a middle portion of an entity that continues in a plurality of groups. Thus, when the entity is the "Start Part of Entity (SPE)" or the "Middle Part of Entity (MPE)", the system controller needs to access the next group.

Figure 16:
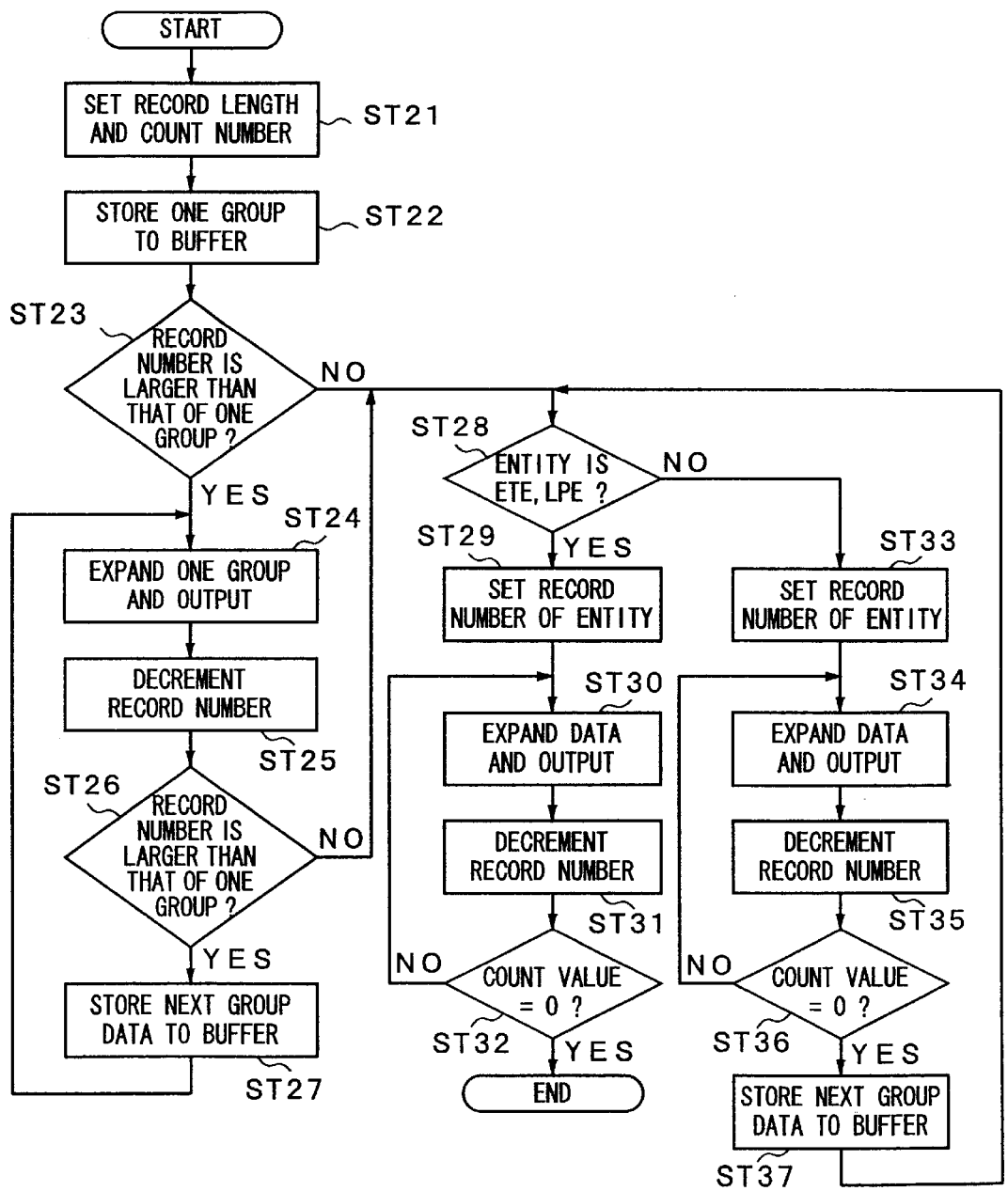
FIG. 16 is a flow chart for explaining a reproduce process of the example of the tape streamer drive according to the present invention.

FIG. 16 is a flow chart showing a process of the tape streamer drive in the reproduce mode. In FIG. 16, the system controller 20 designates the record length and the number of records to the record length register 31 and the record number counter 32, respectively, corresponding to a command received from the host computer (at step ST21). The tape streamer drive reproduces data for one group from the magnetic tape 5. The reproduction data for one group is stored in the buffer memory 19 (at step ST22).

As described above, the GIT stores information of the number of records in the current group. Corresponding to the information, the number of records in the current group can be obtained. The system controller 20 determines whether or not the number of records designated at step ST21 is larger than the number of records of the current group being reproduced (at step ST23).

When the determined result at step ST23 is Yes, the system controller 20 supplies the data for one group stored in the buffer memory 19 to the data compressing/expanding portion 14. The compressing/expanding portion 14 expands the data for one group (at step ST24). When the determined result at step ST23 is No, the flow advances to step ST28. At step ST28, the system controller 20 determines whether or not the entity is the "Entire Entity (ETE)" or the "Last Part of Entity (LPE)" corresponding to the BAT flag.

When the data compressing/expanding portion 14 expands the data for one group, the system controller 20 decrements the number of records that have been supplied from the number of records designated to the record number counter 32 and designates the resultant value as the number of remaining records to the record number counter 32 (at step ST25).

After the data compressing/expanding engine 16 has completed the expanding process of the data for one group stored in the buffer memory 19, the system controller 20 determines whether or not the number of remaining records is larger than the number of records in the current group (at step ST26). When the determined result at step ST26 is Yes, data for the next group is stored in the buffer memory 19 (at step ST27). Thereafter, the flow returns to step ST24. The data for the next group is supplied from the buffer memory 19 to the data compressing/expanding portion 14. The data compressing/expanding portion 14 expands the data for one group.

While the flow is cycling from steps ST24 to ST27, the expanding process for reproduction data is performed for each group. Thus, the number of remaining records decreases. Consequently, the system controller 20 determines that the number of remaining records is not larger than the number of records in the group.

When the determined result at step ST26 becomes No, the system controller 20 determines whether the entity is the "Entire Entity (ETE)" or the "Last Part of Entity (LPE)" corresponding to the BAT flag (at step ST28). As described above, when the BAT flag represents the "Entire Entity (ETE)" or the "Last Part of Entity (LPE)", the system controller 20 determines that the entity is completed in the current block.

When the determined result at step ST28 is Yes, the system controller 20 designates the number of records of the entity to the record number counter 32 (at step ST29). The data of the entity is supplied to the data compressing/expanding portion 14 (at step ST30). The number of records that have been supplied is decremented from the number of records designated to the record number counter 32. The number of remaining records is designated to the record number counter 32 (at step ST31). Thereafter, the system controller 20 determines whether or not the number of remaining records is "0" (at step ST32). When the determined result at step ST32 is Yes, the system controller 20 completes the data reproducing process.

When the determined result at step ST28 is No (namely, the entity is the "Start Part of Entity (SPE)" or the "Middle part of Entity (MPE)" rather than the "Entire Entity (ETE)" or the "Last Part of Entity (LPE)"), since the data of the next entity continues to the next group, the system controller needs to access the next group.

In other words, when the determined result at step ST28 is No, the system controller 28 designates the number of remaining records of the record number counter 32 to the number of records of the entity (at step ST33). The data of the entity is supplied to the data compressing/expanding portion 14 (at step ST34). The number of records that have been supplied is decremented from the number of records designated to the record number counter 32. The resultant value is designated as the number of remaining records to the record number counter 32 (at step ST35). Thereafter, the system controller 20 determines whether or not the number of remaining records is "0" (at step ST36). When the determined result at step ST36 is Yes, the data for the next group is stored in the buffer memory 19 (at step ST37). Thereafter, the flow advances to step ST28.

Since the "Start Part of Entity (SPE)" or the "Middle Part of Entity (MPE)" is processed in steps ST33 to ST37, the first entity of the next group is normally the "Last Part of Entity (LPE)". Thus, at step ST28, the system controller 20 determines that the entity is the "Entire Entity (ETE)" or the "Last Part of Entity (LPE)".

When the determined result at step ST28 is Yes, the flow advances to step ST29. At step ST29, the number of remaining records of the record number counter 32 is designated to the number of records of the entity. At step ST30, the data of the entity is supplied to the data compressing/expanding portion 14. At step ST31, the number of remaining records is designated to the record number counter 32. At step ST32, the system controller 20 determines whether or not the number of remaining records is "0". When the determined result at step ST32 is 0, the system controller 20 completes the data reproducing process.

Figure 17:
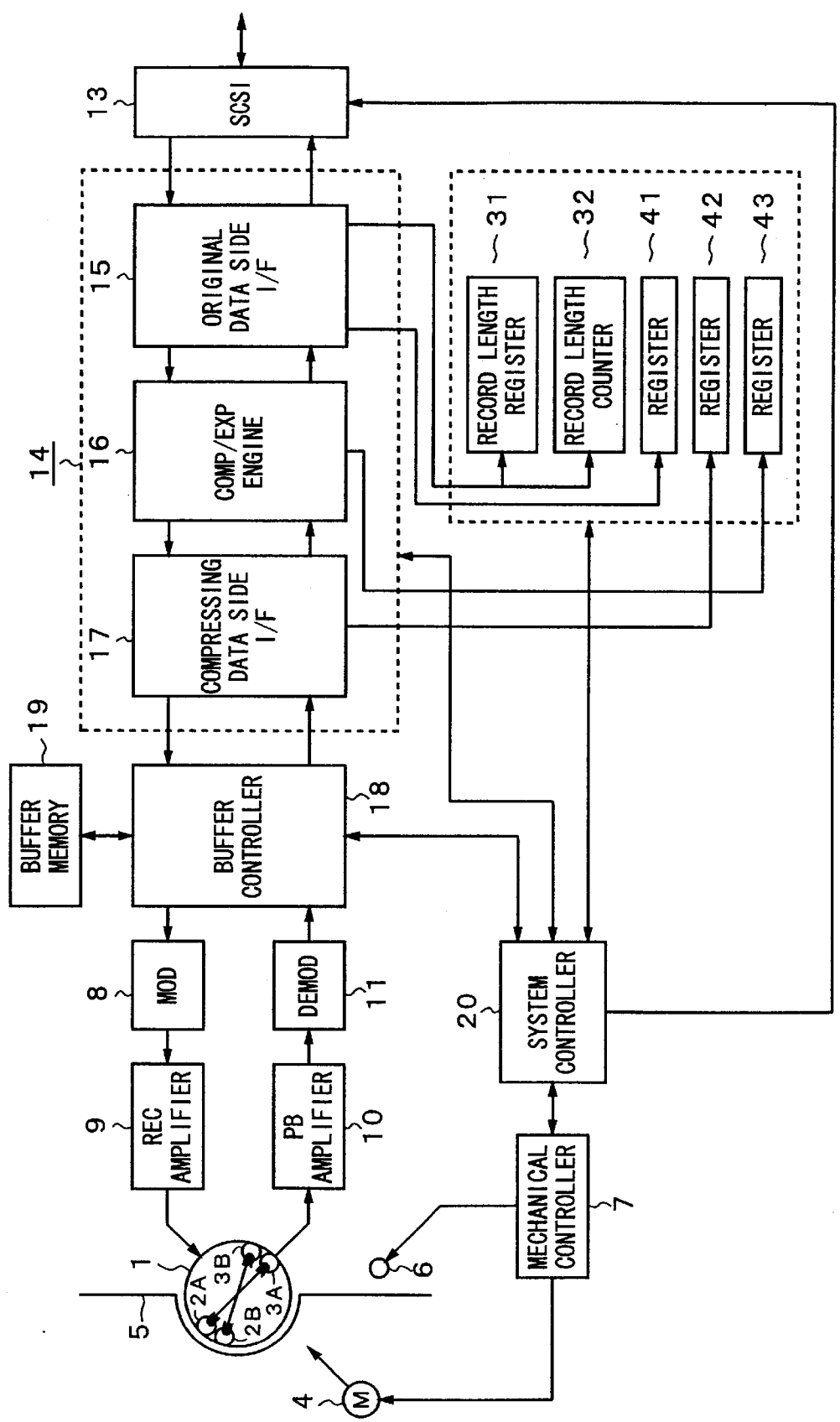
FIG. 17 is a block diagram showing another example of the tape streamer drive according to the present invention.

Next, with reference to FIG. 17, a tape streamer drive according to another embodiment of the present invention will be described. In the above-described embodiment, as shown in FIG. 15, the free space of the buffer memory 19 is monitored. Corresponding to the monitored result, the BAT flag is added. However, in the following example, after data for one group has been compressed, depending on whether or not data remains in the data compressing/expanding portion 14, the BAT flag is added. In other words, as shown in FIG. 17, registers 41, 42, 43 are disposed so as to detect whether or not data remains in the data compressing/expanding portion 14. With the registers 41, 42, and 43, it is determined whether or not data remains in the original data side interface 15, the compression side interface 17, and the data compressing/expanding engine 16. After data for one group has been compressed, with the registers 41, 42, and 43, the system controller determines whether or not data remains in the original data side interface 15, the compression data side interface 17, and the data compressing/expanding engine 16 and adds the BAT flag corresponding to the determined results.

Figure 18:
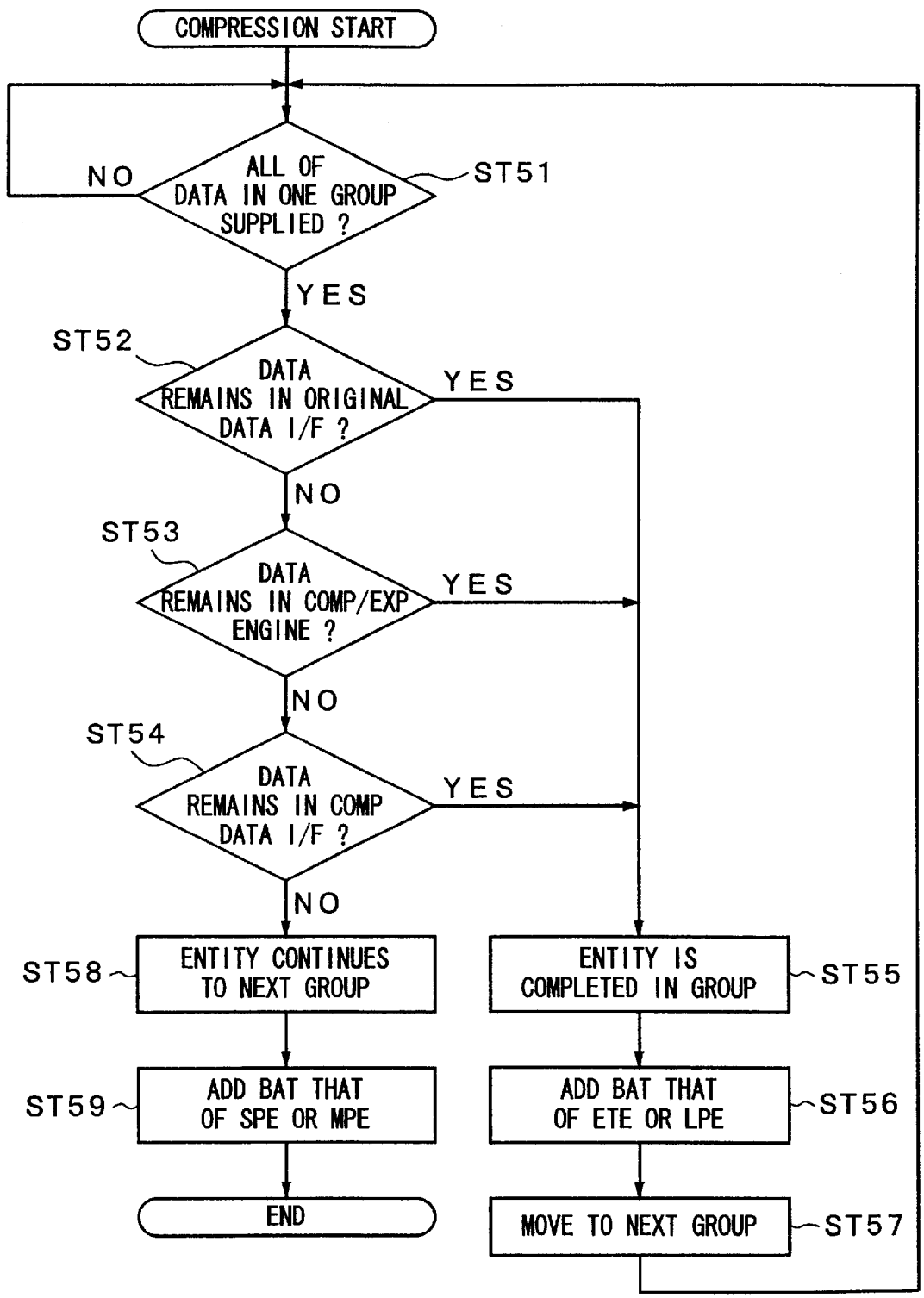
FIG. 18 is a flow chart for explaining another example of the tape streamer drive according to the present invention.

FIG. 18 is a flow chart showing such a process. In FIG. 18, the system controller 20 determines whether or not data for one group has been compressed (at step ST51). When data has not been compressed for one group, the system controller 20 continues the compressing process. The buffer memory has a storage capacity enough to compress the data for one group.

When the data for one group has been compressed, the system controller 20 determines whether or not data remains in the original data side interface 15 corresponding the content of the register 41 (at step ST52).

When the determined result at step ST52 is No, the flow advances to step ST53. At step ST53, the system controller 20 determines whether or not data remains in the data compressing/expanding engine 16 (at step ST53). When the determined result at step ST53 is No, the flow advances to step ST54. At step ST54, the system controller 20 determines whether or not data remains in the compression data side interface 17 corresponding to the content of the register 43.

In steps ST52 to ST54, when data remains in one of the original data side interface 15, the data compressing/expanding engine 16, and the compression data side interface 17, the system controller 20 determines that the entity is the "Start Part of Entity (SPE)" or the "Middle Part of Entity (MPE)" that represents that the entity continues to the next group (at step ST55). In addition, the system controller 20 adds the BAT flag that represents the entity is the SPE or the MPE (at step ST56). The data of the next group is supplied to the data compressing/expanding portion 14.

In steps ST52 to ST54, when data does not remain in one of the original data side interface 15, the data compressing/expanding engine 16, and the compression data side interface 17, the system controller 20 determines that the last entity of the group is the "Entire Entity (ETE)" or the "Last Part of Entity (LPE)" that represents that the entity is completed in the group (at step ST58). Thereafter, the system controller 20 adds the BAT flag that represents that the entity is the ETE or the LPE (at step ST59). Thus, the system controller 20 completes the process for the group.

As described above, according to the present invention, original data that is input as records is compressed. The compressed data is temporarily stored in the buffer memory and then recorded on the magnetic tape. When data is recorded, it is determined whether or not the buffer memory overflows. When the determined result represents that the buffer memory overflows, the value of the counter is dynamically changed. Thus, the buffer memory can be prevented from overflowing. The compressed data is recorded as entities and recorded to each group. The BAT flag that represents the type of the entity is set.

When data is reproduced, it is determined whether the last entity of the current group is an entity that continues to the next group ("Start Part of Entity (SPE)" or "Middle Part of Entity (MPE)") or an entity that is completed in the current group ("Entire Entity (ETE)" or "Last part of Entity (LPE)"). When the last entity is "Start Part of Entity (SPE)" or "Middle Part of Entity (MPE)", the next group is accessed. When the last entity is "Entire Entity (ETE)" or "Last Part of Entity (LPE)", no further accessing operation is performed. Thus, the reproducing process can be effectively performed.

What is claimed is:

1. A digital data recording apparatus, comprising:

inputting means for inputting digital data of a predetermined unit;

a buffer memory for temporarily storing digital data corresponding to a record unit of a record medium;

recording means for recording the digital data stored in said buffer memory to the record medium in the record unit of the record medium;

determining means for determining whether or not the digital data in the predetermined unit continues to the next record unit of the record medium when the digital data stored in the buffer memory is recorded to the record medium, said determining means including a record length register and a record number counter; and identification signal adding means for adding an identification signal to the record medium corresponding to the determined result of said determining means.

2. The digital data recording apparatus as set forth in claim 1, further comprising:

data compressing means compressing the input digital data; and memory controlling means for controlling the buffer memory which temporarily storing the compressed digital data corresponding to a group unit having a fixed length to said buffer memory, wherein said recording means records the digital data stored in said buffer memory to the record medium in the group unit.

3. The digital data recording apparatus as set forth in claim 2, further comprising:

data amount designating means for designating the amount of digital data that is input in the predetermined unit;

buffer capacity detecting means for detecting whether or not said buffer memory becomes full; and means for changing a designated value of said data designating means when said buffer capacity detecting means detects that said buffer memory becomes full.

4. The digital data recording apparatus as set forth in claim 3, wherein said buffer capacity detecting means detects whether or not said buffer memory becomes full corresponding to the difference between the current address of said buffer memory and the last address of said buffer memory.

5. The digital data recording apparatus as set forth in claim 2, further comprising:

a register which represents whether or not data remains in said data compressing means, wherein said register determines whether or not the digital data in the predetermined unit being compressed continues to the next group depending on whether data is represented by the register when digital data stored in said buffer memory is recorded to the record medium.

6. The digital data recording apparatus as set forth in claim 2, wherein the record medium is a tape-shaped record medium, and wherein the group is composed of a plurality of tracks formed on the tape-shaped record medium.

7. A digital data reproducing apparatus comprising:

a reproducing means for reproducing data for each record unit from a record medium on which the digital data has been recorded for each record unit;

a buffer memory for temporarily storing the digital data reproduced for each predetermined unit from the record medium;

outputting means for processing the digital data read from said buffer memory and outputting the digital data in a predetermined unit other than the record unit;

detecting means for detecting an identification signal for determining whether or not the digital data in the predetermined unit continues to the next record unit of the record medium, said detecting means including a record length register and a record number counter; and controlling means for controlling whether or not to reproduce the digital data in the record unit of the next record medium corresponding to the output of said detecting means.

8. The digital data reproducing apparatus as set forth in claim 7, wherein the record medium is a tape-shaped record medium, and wherein the data amount corresponding to the record unit of the record medium is a group with a fixed length composed of a plurality of tracks formed on the tape-shaped record medium.

* * * * *